May 31, 1960
D. BRAUN
2,938,369
SUCTION PIPE FOR THE REMOVAL OF WASTE MATERIAL
IN LEATHER SKIVING MACHINES EQUIPPED
WITH ROTATING BELL KNIFE
Filed Aug. 19, 1958
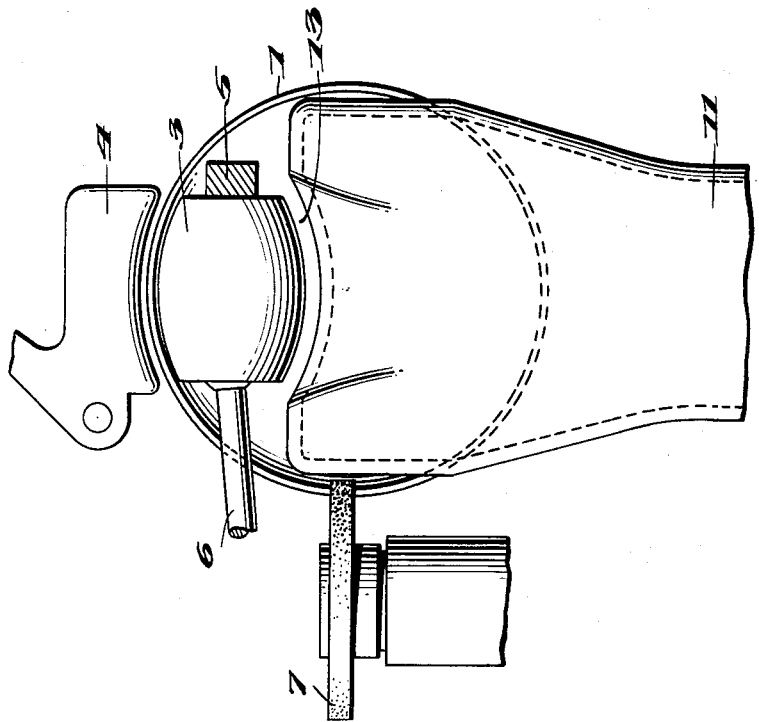
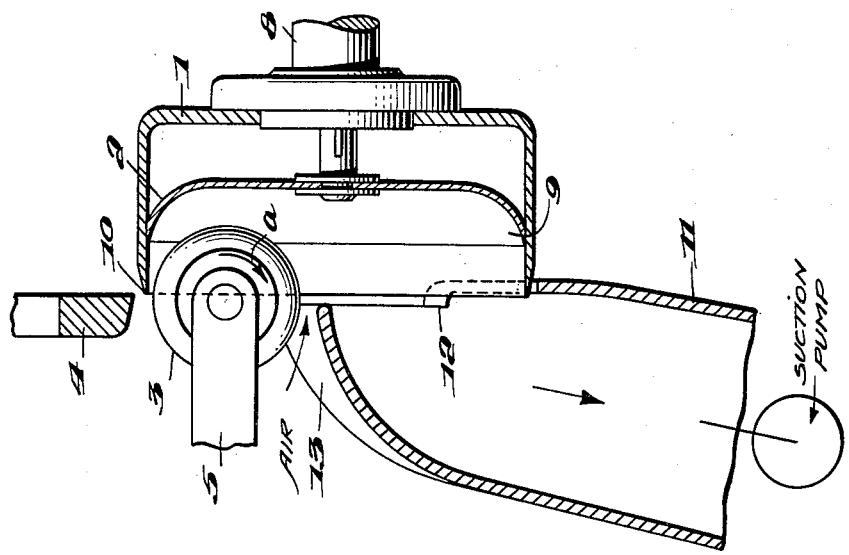
INVENTOR
DIETER BRAUN,
BY Bailey, Stephens & Huettig
ATTORNEYS United States Patent Office 2,938,369
Patented May 31, 1960

2,938,369

SUCTION PIPE FOR THE REMOVAL OF WASTE MATERIAL IN LEATHER SKIVING MACHINES EQUIPPED WITH ROTATING BELL KNIFE

Dieter Braun, Stuttgart, Germany, assignor to Fortuna Werke Spezialmaschinenfabrik A.-G., Stuttgart-Bad Cannstatt, Germany Filed Aug. 19, 1958, Ser. No. 756,021

4 Claims. (Cl. 69—9.5)

The invention relates to leather skiving machines, and more particularly to the removal of scrap therefrom.

Leather skiving machines with bell knives are essentially composed of a rotating bell-shaped knife, which is continuously sharpened during operation by a rotating grinding wheel, a presser foot with a highly polished guide face, and a feed roll with rough surface which extends almost half its diameter into the interior of the bell knife and bears with its curved surface against the knife edge of the bell knife, from which position it is permitted to yield downward against the pressure of a spring. The purpose of the feed roll is two-fold: in the first place, to advance the material by means of its rough surface from under the presser foot towards the cutting edge of the bell knife and, in the second place, to remove the burr which is likely to appear during grinding from the inner face of the knife edge. For this purpose, the feed roll is spring pressed towards the bell knife and brought into the above mentioned position of contact.

The scrap produced in skiving leather and other soft material can vary from strips of $\frac{1}{10}$ mm. minimum in thickness and less and of a few millimeters in width, up to strips of 2 to 3 mm. in thickness and a few centimeters in width, sometimes also up to several meters in length, all depending on the kind of material and the skiving method used.

These thin strips of scrap material may cause serious disturbances in the flow of work, if, because of their clinginess and the fibrous structure of their surface, they adhere to the rough surface of the feed roll and, on further rotation of the feed roll, get under the material to be skived. If the material is to be skived to extreme thinness, any such scrap slipping under the work when the latter is being fed under the presser foot, may cause the work to be damaged at this spot and to be useless, while thicker material, if it deviates from the proper direction of feed, may indirectly disturb the work flow by blocking the feed of material to the knife.

Efforts have been made to eliminate these difficulties by means of scraping devices which are in close contact with the feed roll surface; however, satisfactory results could not be obtained in this way, especially because of the roughness of the feed roll.

Compressed air jets have also been used in place of mechanical scrapers for the removal of scrap adhering to the feed roll, with the direction of the air jet opposite to the direction of rotation of the feed roll; though the waste material is then removed from the feed roll, it is nevertheless not cleared from the zone of danger around the bell knife.

Attempts have also been made to remove the waste material by suction. Suction devices directly connected to the scrap ejection hole require a very high blowing efficiency and thus are not economical. In addition, they cannot ensure that thin strips of waste material do not wind themselves round the feed roll. Even if the end of the suction pipe is advanced into close proximity to the feed roll, so as to project partly into the hollow space within the bell knife, these sucking devices, while removing effectively any waste collected within the bell knife, do not peel off the strips adhering to the feed roll. Therefore, in order to remove such strips from the feed roll and out of the zone around the bell knife or feed roll, a compressed air jet generated by a compressor, and an additional suction blower become necessary.

The primary object of the present invention is to provide a scrap removal device which avoids the disadvantages of the prior art.

Another object of the invention is to provide such a device which is economical yet at the same time effective in removing the scrap.

A further object of the invention is to provide an arrangement in which a single suction fan serves both to withdraw the scraps from the interior of the bell knife and to remove scraps which otherwise might stick to the feed roll.

This is accomplished in general by closing off to the outside air, by the suction nozzle, the greater part of the area of the open mouth of the bell knife except for the portion adjacent the feed roll, thereby closing off the intake of outside air to this area and creating an inflow of air in the area adjacent the feed roll which impinges on the roll as a jet directed against the inner surface of the roll (that is, the surface furthest from the knife edge) in a direction opposite the direction of rotation of such surface so as to prevent scraps from sticking to the feed roll and being carried by it around and under the work.

Specifically, with a conventional suction blower driven by the skiving machine motor, and a suction pipe with a specially formed mouthpiece extending to the very area where waste material is produced, all kinds of scrap may be removed in the usual way by the provision of a waste separator or through natural gravity. The special shape of the mouthpiece generates a sucking air current, which enters the hollow space within the bell knife as an air jet of a direction which is opposed to the rotary direction of the strips adhering to the feed roll, thus preventing them from winding themselves around the feed roll. All scrap will be removed from the feed roll by the blowing force of the sucked-in air current, and pulled into the suction pipe.

The mouthpiece covers at least half of the circular area of the hollow mouth of the bell knife, approaching the outer cylindrical wall of the bell knife so closely that only a narrow slit is left between the knife wall and the suction pipe. Through this narrow slit air will also be sucked in into the hollow space within the bell knife, thus preventing small dust-like scrap particles from escaping into the open air through this slit. In the zone of the feed roll the mouthpiece is given such a shape that its outside wall nearest the feed roll, in conjunction with the feed roll, forms a funnel or nozzle-like aperture through which a stream of air is sucked in into the interior of the bell knife. This has the jet impinge on the feed roll and has the effect of pulling off any scrap material which tends to adhere to the feed roll. This jet, although directed at a sharp tangential angle towards the feed roll, is opposed in direction to the direction of rotation of said feed roll, so that any scrap will be carried along by this stream of air through the suction pipe, and be collected in a waste receptacle.

Those parts of the circular area of the bell knife not covered either by the mouthpiece or by the feed roll, will nevertheless be filled out by parts of the bearing system and the drive parts for the feed roll. The effect of the eddies of air generated by these parts and by the free edge of the bell knife is such that the volume of air passing this eddy zone will actually be smaller than would be expected, considering the ratio of the corresponding cross-sectional areas.

There will scarcely be any eddies in the nozzle-like portion of the air entrance so that the volume of air passing this zone will be relatively large and will have a higher velocity because of the shape of this nozzle. The higher air velocity due to this nozzle effect will produce the necessary sharp stream of air required for the removal of scrap material from the feed roll.

Further advantages and objects of the invention will appear more fully from the following description, especially when taken in conjunction with the accompanying drawings which form a part thereof.

In the drawings:

Fig. 1 is a vertical cross-section through a bell knife with a feed roll and the mouthpiece of a suction pipe; and Fig. 2 is a view of the bell knife looking towards the knife edge.

Bell knife 1 with scrap ejector 2 rotates on the end of shaft 8. Feed roll 3 with bearing 5 and articuated drive shaft 6 extends by almost half its diameter into hollow space 9 within the bell knife 1. It rotates in the direction of arrow *a*. Material to be worked is fed in towards edge 10 of bell knife 1 by feed roll 3 from under presser foot 4. Grinding wheel 7 regrinds knife edge 10 if required. Any burr produced in the regrinding process will be removed by slight contact of the feed roll 3 with the knife edge, the curved surface of the former corresponding with the circular shape of the knife edge, and the casing-line of the knife running nearly at a tangent with the surface of the feed roll.

Suction pipe 11 covers with its mouthpiece a large portion of the circular area of knife edge 10, leaving only a limited sector open in the zone of the feed roll to permit a stream of sucked-in air to enter the hollow space within the bell knife. The scrap material will be sucked in through aperture 12 into suction pipe 11, and will be separated in the usual way. The mouthpiece joins closely the outer cylindrical wall of the bell knife without touching it, so as to allow a stream of air to enter also through this slit formed by the bell knife and the mouthpiece and to penetrate into the interior of the bell knife. The outer wall of the mouthpiece nearest the feed roll is curved transversely substantially to match the shape of the periphery of the feed roll and is curved inwardly to form a nozzle of converging form as shown in cross-section in Fig. 1, so that, in conjunction with the feed roll, it forms a nozzle-like aperture 13 for the stream of air (indicated by arrow *b*) penetrating into the hollow space within the bell knife. The outer wall of the mouthpiece leaves enough space in the zone of the grinding wheel 7 for the operation of said grinding wheel.

While I have described herein one embodiment of my invention, I wish it to be understood that I do not intend to limit myself thereby except within the scope of the claims hereto or hereinafter appended.

I claim:

1. In a leather skiving machine having a bell-shaped knife with an open mouth mounted to rotate about an axis and a feed roller having a barrel-shaped surface mounted to rotate about an axis transverse to the axis of rotation of the knife and extending substantially half its radius into the knife and having its surface adjacent the cutting edge of the knife, and means to rotate said roller, scrap removal means comprising means closing off to the intake of outside air the greater part of the open mouth of the bell knife other than the area adjacent the feed roll, and means to exert a suction within the bell knife, whereby air entering under such suction impinges on that portion of the periphery of the feed roll remote from the inner wall of the bell knife in a direction opposing the direction of rotation of such portion so as to remove scrap therefrom.

2. In a leather skiving machine having a bell-shaped knife with an open mouth mounted to rotate about an axis and a feed roller having a barrel-shaped surface mounted to rotate about an axis transverse to the axis of rotation of the knife and extending substantially half its radius into the knife and having its surface adjacent the cutting edge of the knife, and means to rotate said roller, scrap removal means comprising a suction mouthpiece fitting closely the cutting edge of the knife and covering substantially the whole area of the open mouth other than the area adjacent the feed roller, the area adjacent the roller being open, whereby air drawn into this last area impinges on that portion of the periphery of the feed roll remote from the inner wall of the bell knife in a direction opposing the direction of rotation of such portion so as to remove scrap therefrom.

3. In a machine as claimed in claim 2, said suction mouthpiece having a curved outer surface adjacent the feed roll which converges towards the feed roll to form a nozzle for the air impinging on the feed roll.

4. In a machine as claimed in claim 2, said suction mouthpiece being slightly spaced from the bell knife at points other than those adjacent the feed roll forming a narrow slit through which air is sucked to draw dust-like particles into the mouthpiece.

No references cited.